United States Patent [19]

Fischer et al.

[11] Patent Number: 4,935,269
[45] Date of Patent: Jun. 19, 1990

[54] LONGITUDINAL SIDE EDGE OF A MOTOR VEHICLE AND PROFILED STRIP COMBINATION

[75] Inventors: Rolf Fischer, Hanover; Dietmar Hermann, Garbsen, both of Fed. Rep. of Germany

[73] Assignee: Continental Aktiengesellschaft, Hanover, Fed. Rep. of Germany

[21] Appl. No.: 160,685

[22] Filed: Feb. 26, 1988

[30] Foreign Application Priority Data

Feb. 26, 1987 [DE] Fed. Rep. of Germany ....... 3706197

[51] Int. Cl.⁵ .................. B60R 13/04; E06B 7/16
[52] U.S. Cl. .................................. 428/31; 49/490; 52/716; 293/128; 428/122
[58] Field of Search ............ 52/716; 428/31, 122; 49/476, 490; 293/128

[56] References Cited

U.S. PATENT DOCUMENTS

| | | | |
|---|---|---|---|
| 1,576,527 | 3/1926 | McBride | 428/31 X |
| 3,471,979 | 10/1969 | Herr | 428/31 X |
| 3,527,013 | 9/1970 | Kruschwitz | 49/490 X |
| 3,665,646 | 5/1972 | Niemanns | 52/716 X |
| 4,410,211 | 10/1983 | Kloppe et al. | 428/122 X |
| 4,601,149 | 7/1986 | Dokan | 52/716 X |
| 4,708,895 | 11/1987 | Mizusawa | 428/31 |
| 4,750,781 | 6/1988 | Betteridge | 52/716 X |

FOREIGN PATENT DOCUMENTS

| | | | |
|---|---|---|---|
| 6808025 | 4/1969 | Fed. Rep. of Germany | 296/213 |
| 3003216 | 8/1981 | Fed. Rep. of Germany | 428/122 |
| 3150027 | 6/1983 | Fed. Rep. of Germany | 296/213 |
| 2548742 | 1/1985 | France | 428/31 |
| 331393 | 8/1958 | Switzerland | 428/31 |
| 2200870 | 8/1988 | United Kingdom | 428/31 |

*Primary Examiner*—Henry F. Epstein
*Attorney, Agent, or Firm*—Robert W. Becker & Associates

[57] ABSTRACT

A combination of a longitudinal side edge of a vehicle with a profiled elastomeric strip that at least partially covers the side edge. The central cross-sectional portions of both the longitudinal side edge and the profiled strip extend linearly or with a slight curvature, while at least one of the side edge portions has longitudinal portions that are irregularly recessed and projecting. The associated side portion of the profiled strip has a cross-sectional contour that in the longitudinal direction respectively changes in opposite directions to a like extent, so that also this side portion of the profiled strip rests continuously against the longitudinal side edge of the vehicle.

4 Claims, 1 Drawing Sheet

LONGITUDINAL SIDE EDGE OF A MOTOR VEHICLE AND PROFILED STRIP COMBINATION

BACKGROUND OF THE INVENTION

The present invention relates to the combination of the longitudinal side edge of a motor vehicle, such as an automobile, with a profiled strip that is made of elastomeric material, at least partially covers the longitudinal side edge, has a continuous central portion that in the longitudinal direction extends linearly or has a slight, especially constant, curvature, and to each side of the central portion has a respective side portion, whereby the central portion is frictionally or otherwise positively connected to a similarly continuous central portion of the longitudinal side edge, with at least one of the side portions of the profiled strip being continuously supported against an associated side portion of the longitudinal side edge of the vehicle.

Similar combinations of the longitudinal side edge of a motor vehicle and elastomeric profiled strip coverings are known, for example, from German Offenlegungsschrift 3 0 03 216, Kloppe et al dated Aug. 6, 1981 (Ford) German Offenlegungsschrift 31 50 027, Knüdel dated June 23, 1983 (VW) and German Gebrauchsmuster 68 08 025, dated Nov. 21, 1968 (Citroen) where in particular the lateral connection of the sheet metal roof to the sheet metal sidewalls of motor vehicles is embodied in this manner, and the profiled strip that is disposed in this connection region serves to cover sharp sheet metal edges, to fill or cover longitudinal gaps that remain, and/or to provide a seal, especially relative to movable side parts of the automobile body, such as doors or windows. In addition, a groove or lip can be formed in or on the outer side of the profiled strip to form a rain gutter or a seal.

Up to now, this type of longitudinal side edge of a motor vehicle was generally constructed in such a way that that region thereof that was to be covered by a profiled strip had a cross-sectional contour that was constant over the entire longitudinal length of the side edge. The result was that a profiled strip having a similarly constant cross-sectional contour in the longitudinal direction could be continuously placed against the side edge with an exact fit. However, such a constant cross-sectional contour obviously implies a considerable limitation and compromise of the possibilities for the structural and aesthetic shape of the body of the vehicle. This is true because the builder and designer frequently did not have the freedom to dispose and configure the seam or abutment location of two body parts, especially the roof and one or more sidewall parts, which form the pertaining longitudinal side edge of the vehicle, in such a way that either an optimum strength of the automobile body, especially a maximum rigidity of the passenger compartment in the directions of stress that are critical when an accident occurs, or an aerodynamically and aesthetically optimum bodY shape results.

It is therefore an object of the present invention to provide a longitudinal side edge and profiled strip combination of the aforementioned general type that eliminates the aforementioned limitations.

BRIEF DESCRIPTION OF THE DRAWING

This object, and other objects and advantages of the present invention, will appear more clearly from the following specification in conjunction with the accompanying schematic drawing, in which.

SUMMARY OF THE INVENTION

Figure 1:
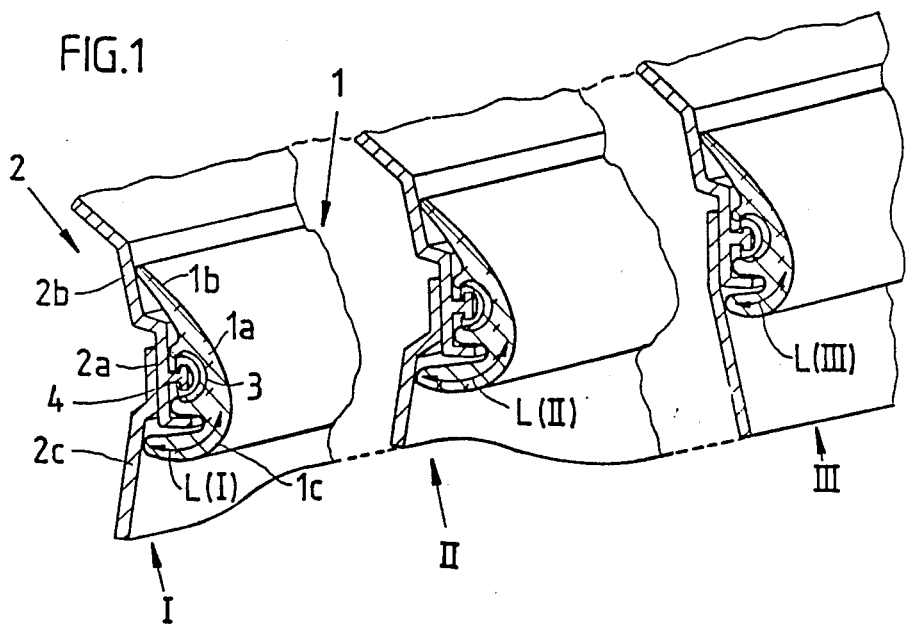
FIG. 1 is a perspective view of one exemplary inventive embodiment of the longitudinal side edge of a vehicle and a profiled strip combination, with cross-sections being taken at various locations along the longitudinal length.

The inventive combination of the longitudinal side edge of a motor vehicle with a profiled strip is characterized primarily in that, where at least one of the side portions of the longitudinal side edge has portions that, along the longitudinal length of that side portion, extend back from and/or project forward from one and the same imaginary normal plane, the associated one of the side portions of the profiled strip conforms to the longitudinal character of that at least one side portion of the side edge by being provided with transversely extending portions having lengths that conform to the deviations of the side edge portions from this normal plane, i.e. the transversely extending portions are longer where associated with a side edge portion that extends back from the plane and are shorter where associated with a side edge portion that projects forward from the plane, in such a way that said at least one side portion of the profiled strip, remote from the central portion thereof, continuously rests against the associated side portion of the longitudinal side edge.

The inventive combination of (a) a longitudinal side edge of a motor vehicle, where at least one side edge portion has changing cross-sectional shapes in the longitudinal direction, and (b) an elastomeric profiled strip, the associated side portion of which is provided with a cross-sectional contour that respectively changes in the opposite direction, provides in a particularly straightforward and technically as well as aesthetically elegant manner, the possibility of, for example, disposing the longitudinal connection between a vehicle roof and the side parts of the body in the region of the upper edges of the window and door openings, where the side parts do not extend as continuous, universally curved surfaces, but rather have parts that are not only recessed but also project from an imaginary normal plane. Thus, only the central cross-sectional regions of not only the longitudinal side edge of the vehicle but also of the profiled strip that is to be secured thereto need to extend linearly or with a slight curvature, especially a monotonic or constant curvature. Although consequently the central cross-sectional regions of not only the longitudinal side edge of the vehicle but also of the profiled strip have a different longitudinal character than does at least one of the side portions of the longitudinal side edge and of the profiled strip, it is possible pursuant to the present invention to ensure that also the outer edge of this side portion of the profiled strip is also continuously supported against the vehicle body in such a manner that no gaps are formed. In so doing, first of all the associated side portion of the longitudinal side edge of the vehicle is covered in a dirt tight and water tight manner, and second of all the profiled strip is stabilized against lateral tilting and shifting. Thus it is generally unnecessary to take additional special measures, such as providing transverse reinforcement of the profiled strip by embedding metallic inserts therein, as was previously necessary to provide the required stability or rigidity.

The inventively provided profiled strip preferably comprises a strip that is formed by extrusion of an elastomeric material, and that has a cross-sectional shape prescribed by the extrusion nozzle. Following the extrusion, transverse portions of varying widths are cut away from at least one side portion of the profiled strip via a cut that is carried out continuously in the longitudinal direction.

Pursuant to the present invention, to interconnect the longitudinal side edge of the vehicle with its profiled strip, the longitudinal side edge is preferably provided along its central portion with projections, especially in the form of T bolts, that are essentially disposed equidistant from one another; securely embedded in the central portion of the profiled strip is a continuous connecting or clamping strip that has an essentially C-shaped cross-sectional shape, with the clamping strip embracing or grasping the aforementioned projections of the central portion of the longitudinal side edge of the vehicle in a positive interlocking manner.

Further specific features of the present invention will be described in detail subsequently.

DESCRIPTION OF PREFERRED EMBODIMENTS

Referring now to the drawing in detail, the inventive longitudinal side edge 2 of a motor vehicle, for example an automobile, is illustrated in FIG. 1 and represents the joining of two sheet metal automobile parts, one of which can be the sheet metal roof, and the other of which can be one sheet metal side of the body that is welded to the roof. The central portion 2a of the longitudinal side edge 2 extends in the longitudinal direction either linearly or with a slight, especially monotonic or constant, curvature, so that the correspondingly extending central portion 1a of the profiled strip 1 can be secured to the central portion 2a of the side edge 2 without difficulty. To secure the profiled strip 1 to the side edge 2, a connecting or clamping strip 3 is preferably embedded in the profiled strip 1. The clamping strip 3 has an essentially C-shaped cross-sectional shape, and cooperates with T bolts 4 that are securely disposed along the central portion 2a of the longitudinal side edge 2 in such a way as to project therefrom; the clamping strip 3 resiliently grasps the heads of the T bolts 4, or conical intermediate parts secured to these heads, in a clamping manner.

In the illustrated embodiment, the upper side portions 1b and 2b follow a uniform course in conformity with the central portions 1a and 2a. In contrast, the lower side portion 2c of the longitudinal side edge 2, which may, for example, extend along the tops of the side windows or doors, is provided with recessed and projecting portions I, II, and III; in other words, some parts of the lower side portion 2c, such as the portions I and/or II, extend back or away from a normal plane of that side of the vehicle, while other parts of the lower side portion 2c, such as the portion III, project toward or from this normal plane. Pursuant to the present invention, these recessed and projecting portions I, II, and III are compensated for by appropriately longer or shorter transversely extending portions L(I), L(II), and L(III) of the lower side portion 1c of the profiled strip 1 in such a way that the side portions 1c and 2c rest continuously against one another along their entire longitudinal length. In this way, not only is a dirt tight and water tight covering of the longitudinal side edge of the vehicle provided, but the profiled strip is also prevented from tilting or tipping as a result of lateral forces. This is particularly important if the profiled strip 1, as indicated in FIG. 2, is also provided with a sealing lip 5 or the like that can serve as a door seal and that, in order to satisfactorily fulfill its function, would require an additional reinforcing metallic insert in the profiled strip if the latter did not already have an adequate stability or rigidity due to the inventively provided continuous support of the side portion 1c of the profiled strip.

Figure 2:
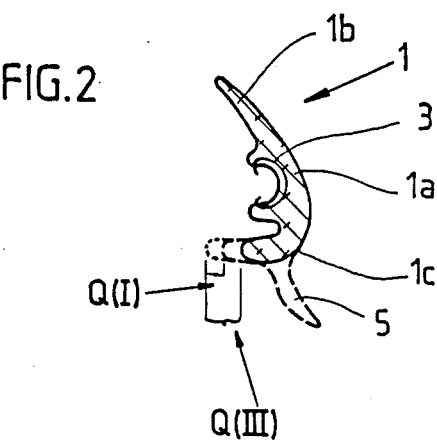
FIG. 2 is a cross-sectional view of one exemplary embodiment of the inventive profiled strip showing various cross-sectional contours that are preferably produced by cutting one of the side portions of the profiled strip.

Pursuant further according to the present invention, the profiled strip 1 is preferably formed as a portion of an endlessly extruded strip of elastomeric material, with, as indicated in FIG. 2, different widths of transverse portions Q(I), Q(III) of the side portion 1c being cut away by a cut that is continuously carried out in the longitudinal direction in conformity with the longitudinal contour of the side portion 2c of the longitudinal side edge 2 of the vehicle.

The present invention is, of course, in no way restricted to the specific disclosure of the specification and drawing, but also encompasses any modifications within the scope of the appended claims.

What we claim is:

1. In a sealing arrangement along a variable shape longitudinal side edge of a motor vehicle with a variable shape profiled strip that is made of elastomeric material furthermore having an outer edge that extends fully straight in a location remote from the variable shape longitudinal side edge of the motor vehicle, and that said variable shape profiled strip at least along an inner edge thereof partially covers said variable shape longitudinal side edge, that has a continuous central portion which in the longitudinal direction extends linearly and has a slight curvature, and that to each side of said continuous central portion has a respective side portion, said continuous central portion of said profiled strip being frictionally or otherwise positively connected to a similarly continuous central portion of said longitudinal side edge of the motor vehicle, with at least one of said side portions of said profiled strip being continuously supported against one of two associated side portions of said variable shape longitudinal side edge of the motor vehicle, the improvement in combination therewith comprising:

along locations where at least one of said side portions of said variable shape longitudinal side edge of the motor vehicle includes variable-distance-contour side portions that, along the longitudinal length of that edge side portion of the motor vehicle, extend back from and/or project forward from one and the same imaginary normal plane to varying transverse extents of prolongation, the associated one of said side portions of said variable shape profiled strip conforms to and complements said variable-distance-contour side portions along the longitudinal side edge of the motor vehicle by being provided with transversely extending portions having varying lengths of changing distance that conform directly to the deviations and variable-distance-contour side portions of the motor vehicle in departures from said normal plane, said transversely extending portions having varying lengths of changing distance that are longer where associated with a portion of said variable shape longitudinal side edge of the motor vehicle that extends back from said normal plane, and are shorter where associated with a portion of said variable shape longitudinal side edge that projects forward from said normal plane, so that said side portion of said variable shape profiled strip that is associated with said at least one edge side portion of the motor vehicle continuously rests complementary in mating position against the latter via a complementary variation and changing distance of the portion of said side portion of said profiled strip that is positioned in a location remote from said central portion of the latter and not constant in cross section particularly for said variable-distance-contour side portions of said profiled strip commensurate with and compensating for the deviations and variable-distance-contour portions of said variable shape longitudinal side edge of the motor vehicle.

2. The combination of claim 1, wherein said profiled strip is a piece that is cut to length from an endlessly extruded strip formed of elastomeric material, whereby to obtain said transversely extending portions of varying lengths, transverse portions of varying widths are cut away from at least one of said side portions of said profiled strip via a cut that is carried out continuously in the longitudinal direction.

3. The combination of claim 1, wherein said central portion of said longitudinal side edge is provided with projections, and wherein a clamping strip that is continuous in the longitudinal direction is securely connected to said central portion of said profiled strip; said clamping strip has an essentially C-shaped cross-sectional shape, and grasps said projections of said central side edge portion in a positive interlocking manner to effect said positive connection of said profiled strip to said longitudinal side edge.

4. The combination of claim 3, in which said projections of said central side edge portions are T bolts that are equidistantly disposed therein, and in which said clamping strip is embedded in said central portion of said profiled strip.

* * * * *